United States Patent
Yen et al.

(10) Patent No.: US 7,258,311 B2
(45) Date of Patent: Aug. 21, 2007

(54) LIQUID CRYSTAL DISPLAY

(75) Inventors: Ching-Hui Yen, Taoyuan (TW); Posen Chiu, Taoyuan (TW)

(73) Assignee: Benq Corporation, Taoyuan (TW)

( * ) Notice: Subject to any disclaimer, the term of this patent is extended or adjusted under 35 U.S.C. 154(b) by 224 days.

(21) Appl. No.: 10/806,493

(22) Filed: Mar. 23, 2004

(65) Prior Publication Data
US 2004/0189890 A1 Sep. 30, 2004

(30) Foreign Application Priority Data
Mar. 27, 2003 (TW) .............................. 92106921 A

(51) Int. Cl.
*A47F 5/12* (2006.01)
(52) U.S. Cl. ...................................... 248/133; 248/923
(58) Field of Classification Search ........... 248/123.11, 248/123.2, 125.2, 121, 917, 918, 919, 922, 248/923, 132, 133; 348/825, 827, 828; 361/681, 361/683
See application file for complete search history.

(56) References Cited

U.S. PATENT DOCUMENTS

| | | | | |
|---|---|---|---|---|
| 4,266,747 A | * | 5/1981 | Souder et al. | 248/280.11 |
| 4,834,329 A | * | 5/1989 | Delapp | 248/183.3 |
| 4,852,842 A | * | 8/1989 | O'Neill | 248/284.1 |
| 5,501,420 A | * | 3/1996 | Watt et al. | 248/280.11 |
| 5,870,280 A | * | 2/1999 | Cho | 361/681 |
| 6,015,120 A | * | 1/2000 | Sweere et al. | 248/123.11 |
| 6,378,829 B1 | * | 4/2002 | Strater et al. | 248/276.1 |
| 6,478,275 B1 | * | 11/2002 | Huang | 248/284.1 |
| 6,672,553 B1 | * | 1/2004 | Lin | 248/276.1 |
| 6,819,550 B2 | * | 11/2004 | Jobs et al. | 361/683 |
| 2003/0075653 A1 | * | 4/2003 | Li | 248/274.1 |
| 2004/0021051 A1 | * | 2/2004 | Chiu | 248/371 |

* cited by examiner

*Primary Examiner*—A. Joseph Wujciak, III
(74) *Attorney, Agent, or Firm*—Quintero Law Office

(57) ABSTRACT

A liquid crystal display having a supporting base, a display unit and a pre-force mechanism. The supporting base has at least one pivot and at least two sections joined thereby, and the display unit is connected to the supporting base, exerts a first torque on the pivot by the weight of the display unit. The pre-force mechanism is connected to the pivot and exerts a second torque on the pivot. The first torque is opposite to the second torque.

14 Claims, 9 Drawing Sheets

LIQUID CRYSTAL DISPLAY

BACKGROUND OF THE INVENTION

1. Field of the Invention

The present invention relates to a liquid crystal display, and in particular to a liquid crystal display with a supporting base.

2. Description of the Related Art

In FIG. 1, a conventional liquid crystal display on a surface 5 is situated in a stable condition. W is the weight of the display unit 1, and F is external force used for lifting up the display unit 1. The force F is directly on the display unit 1 and rotated the first pivot 22 in a counterclockwise direction.

The liquid crystal display has a display unit 1 and a supporting base 2. The supporting base 2 has a first section 21, a first pivot 22, a second section 23, a second pivot 24, a third section 25 and a plate 26. The first pivot 22 and the second pivot 24 have the same structure, and the first pivot 22 connects the first section 21 and the second section 23, and the second pivot 24 connects the second section 23 and the third section 25. The display unit 1 is connected to the third section 25 by the plate 26. The plate can be integrally formed on the end of third section 25, and the display unit 1 can be directly mounted on the third section 25. Thus, the position of the display unit 1 can be adjusted upwardly or downwardly by rotating the second section 23 around the first pivot 22, and the tilt angle of the display unit 1 can be adjusted by rotating the third section 25 around the second pivot 24.

FIG. 2 is a cross-section of the first pivot 22 of FIG. 1 along its longitudinal direction. The fixed element 211 is a part installed on the first section 21 of the supporting base 2, and the first section is positioned on the surface 5 motionlessly. The movable element 231 is a part installed on the second section 23 of the supporting base 2. A bolt 221 passes through the fixed element 211 and the movable element 231 and is secured by a nut 222. Several washers 224 function as frictional disks between the bolt 221 and the fixed element 211, as well as between the fixed element 211 and the movable element 231. The washers 224 are made of soft material, such as rubber, plastic or the like. A U-shaped washer 223 and another washer 224 are disposed between the movable element 231 and the nut 222. The U-shaped washer 223 is used to keep the washer 224 attaching to the fixed element 211 or the moveable element 231. The U-shaped washer 223 can be made of rigid, flexible material, such as steel, copper or the like.

When the nut 222 rotates toward the head 221 H, the U-shaped washer 223 is pushed and moved toward the washer 224 disposed next to the movable element 231, and the fixed element 211 and the movable element 231 are pressed and pushed to approach each other, bracketed by the deformed washers 224. These deformed washers 224 provide a frictional force to the fixed element 211 and the movable element 231, to balance the weight of the display unit 1.

Referring again to FIG. 1 and also to FIG. 3, as the liquid crystal display is placed on the surface 5, the weight W of the display unit 1 exerts a gravity torque $T_W$ by the weight of the display unit 1 on the first pivot 22 in a clockwise direction. In the same time, a static frictional force is generated within the first pivot 22 and exerts a frictional torque $T_{F1}$ on the first pivot 22 in a counterclockwise direction.

In the first pivot 22, frictional torque $T_{F1}$ is equal to gravity torque $T_W$ ($T_{F1}=T_W$), i.e., the display unit 1 is stable. The static frictional force, however, is variable. The amount of the static frictional force is increased when the external force applied on an object increases. When the static frictional force is increased to a critical value, i.e., maximum static frictional force, the object is moving because of the external force, The frictional force becomes a dynamic friction force, and the value of the frictional force decreases and reaches a constant. In this related art, $T_{F1}$ is a frictional torque generated by the maximum static frictional force within the first pivot 22.

When the display unit is stable on the surface 5, the direction of the frictional torque $T_{F1}$ is opposite to that of the gravity torque $T_W$. When an external force is applied to lift the display unit 1, the direction of the frictional torque $T_{F1}$ is changed. When the display unit 1 is successfully lifted, the torque generated by external force F must overcome the sum of the frictional torque $T_{F1}$ and gravity torque $T_W$. In FIG. 4, $T_{F2}$ is a torque generated by the external force F in a counterclockwise direction on the first pivot 22. Thus, torque $T_{F2}$ must be larger than the sum of frictional torque $T_{F1}$ and gravity torque $T_W$ ($T_{F1}+T_W$). The direction of frictional torque $T_{F1}$ (clockwise, in FIG. 4) is opposite to the direction of frictional torque $T_{F1}$ (counterclockwise, in FIG. 3.) because the direction of the maximum static frictional force is changed.

In general, the nut 222 secured on the bolt 221 is tightly driven, such that the washers 224 can be closely attached on the fixed element 211 and the movable element 231, and therefore sufficient frictional force is generated therebetween to balance the weight of the display unit 1. However, the display unit 1 becomes difficult to adjust or position at a predetermined height or angle from the nut 222 on the bolt 221 being over-tightened.

When the nut 222 is tightly connected to the bolt 221, the maximum static frictional force within the first pivot 22 is large and the frictional torque $T_{F1}$ is also very large. Therefore, the torque $T_{F2}$, generated by the external force F, used to overcome the frictional torque, is also large.

If the external force F is too big, the first section will also be lifted to leave the surface 5 when adjusting the position of the display unit 1 as shown in FIG. 5. Therefore, another force N is need to apply on the first section 21 of the supporting base 2 to prevent the first section 21 from leaving the surface 5. However, it is inconvenient to manually adjust the position or the angle of the display unit 1.

SUMMARY OF THE INVENTION

Accordingly, an object of the invention is to provide a pre-force mechanism in a pivot of a liquid crystal display, allowing easy lifting of a display unit.

The invention provides a liquid crystal display having an supporting base, a display unit, and a pre-force mechanism. The supporting base has at least two sections and at least one pivot, the two sections connected by the pivot.

The display unit is lifted by the supporting base. The display unit is connected to one of the two sections, and exerts a first torque on the pivot by a weight of the display unit. The pre-force mechanism is connected to the pivot and exerts a second torque on the pivot. The second torque and the first torque are in opposite directions. Therefore, the torque generated by external force is substantially reduced, and the display unit can be easily lifted or adjusted.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
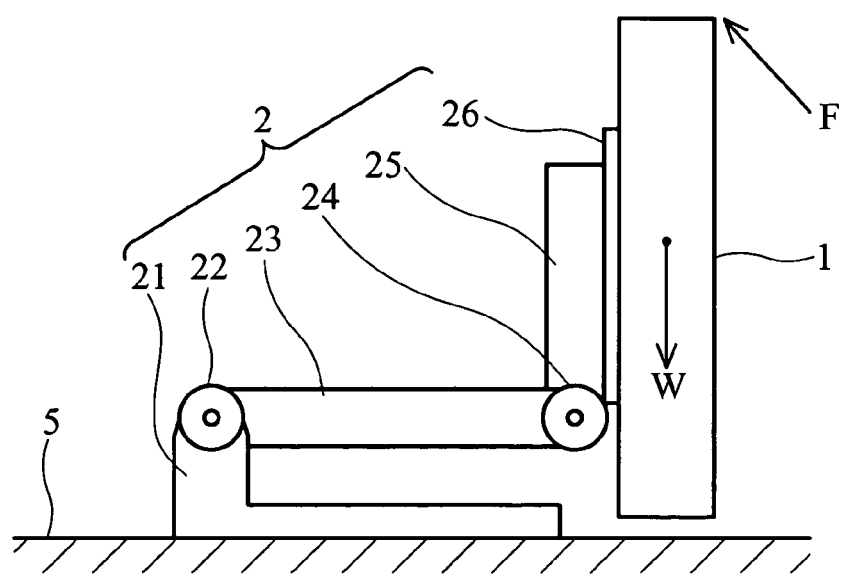
FIG. 1 is a schematic view of a conventional liquid crystal display.
Figure 2:
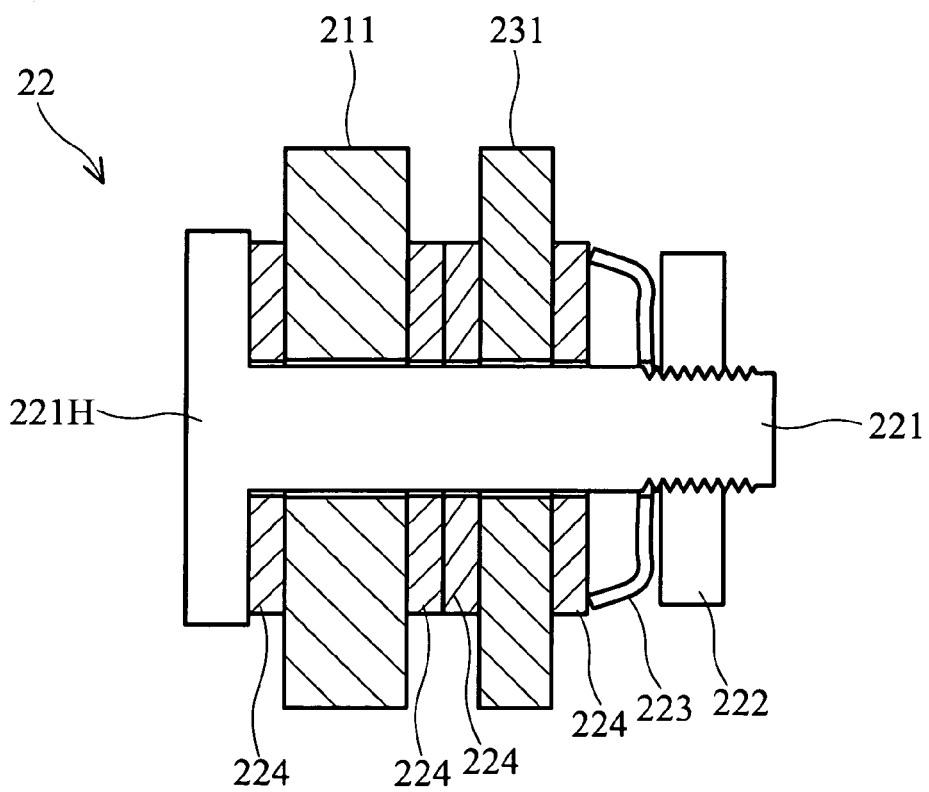
FIG. 2 is a cross-section of a first pivot (22) of the liquid crystal display of FIG. 1 along its longitudinal direction.
Figure 3:
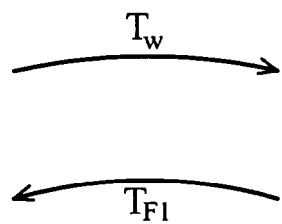
FIG. 3 is a diagram of the equilibrium of force (torques) on the liquid crystal display in FIG. 1.
Figure 4:
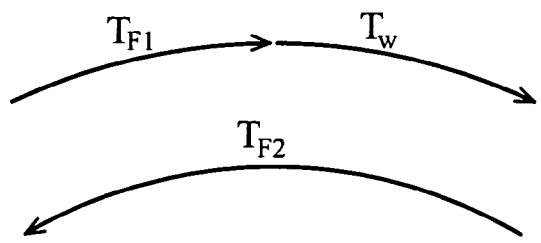
FIG. 4 is a diagram of the equilibrium of force (torques) on the liquid crystal display in FIG. 1, wherein a display unit (1) of the liquid crystal display is lifted.
Figure 6:
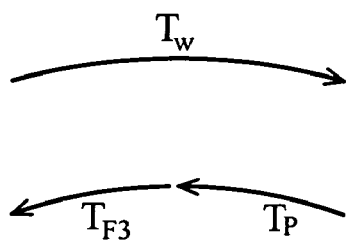
FIG. 6 is a diagram of the equilibrium of force (torques) on a liquid crystal display according to the present invention.

As shown in FIG. 6, when the liquid crystal display is situated in a stable condition, the present invention provides a pre-force mechanism 3 (as FIG. 8) to generate a second torque $T_P$ in a pivot of a liquid crystal display (LCD) in advance, such that the second torque $T_P$ is formed to overcome a first torque $T_W$ generated by the weight of the display unit 1. The direction of the first torque $T_W$ is opposite to that of the second torque $T_P$. In addition, a third torque is exerted on the pivot of the LCD because of the frictional force within the pivot. When the LCD is situated in the stable condition, the first torque $T_W$ generated by the weight of the display unit 1 is larger than the second torque $T_P$ formed by the pre-force mechanism 3 and the third torque $T_{F3}$ formed by the frictional force, that is, $T_W \geq T_{F3} + T_P$. Because of the second torque $T_P$, the third torque $T_{F3}$, the frictional torque for balancing the weight of the display unit 1, can be reduced. That is to say, the frictional torque $T_{F3}$ in FIG. 6 is smaller than the frictional torque $T_{F1}$ in FIG. 4.

When an external force F is applied to lift the display unit 1, the fourth torque $T_{F4}$ is the torque generated by the external force F on the first pivot 22 in a counterclockwise direction. In addition, the direction of the frictional force within the pivot is changed.

Figure 5:
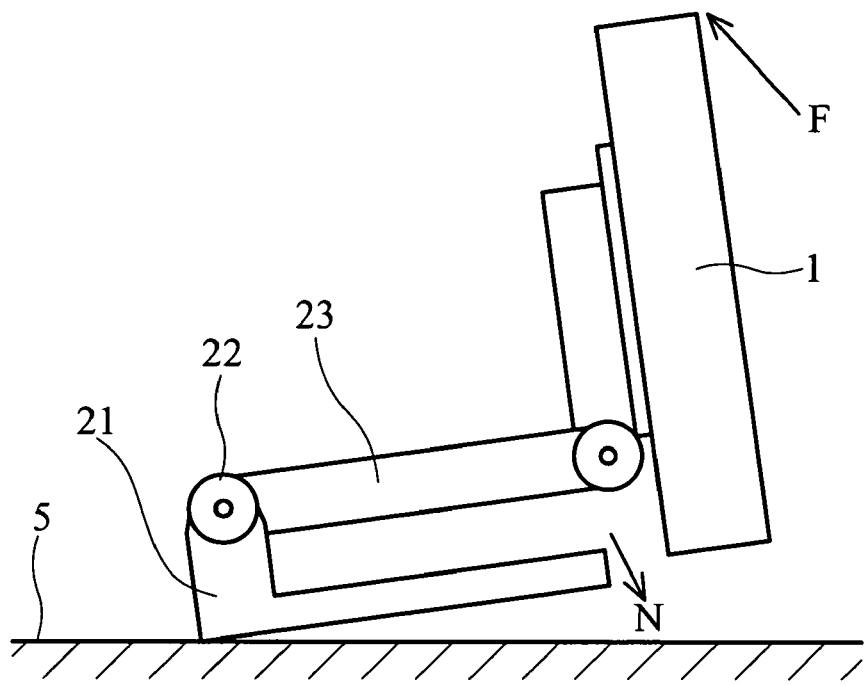
FIG. 5 is a schematic view of the liquid crystal display in FIG. 1, wherein the display unit (1) of the liquid crystal display is lifted.
Figure 7:
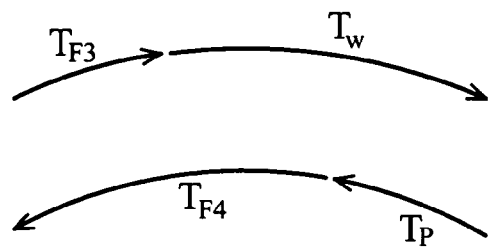
FIG. 7 is a diagram of the equilibrium of force (torques) on the liquid crystal display of the present invention, wherein the display unit (1) of the liquid crystal display is lifted.

The expression of the equilibrium formula of the state in FIG. 7 is written as $T_{F4} + T_P = T_{F3} + T_W$. When the display unit 1 is lifted because of the external force F, the torque $T_{F4}$ generated by external force F needs to overcome the first torque $T_W$ generated by the weight of the display unit 1 and the frictional torque $T_{F1}$. However, the second torque $T_P$ is exerted on the pivot in advance. Therefore, the torque $TF_4$ can be reduced and the external force F can also be reduced. That is to say, the display unit 1 can be lifted or adjusted without additional force N on the first section 21 as shown in FIG. 5.

It can be seen that frictional torque $T_{F3}$ as the LCD is positioned in the stable status as shown in FIG. 6 is effectively reduced and the torque $T_{F4}$ generated by external force F is reduced commensurately.

Figure 8:
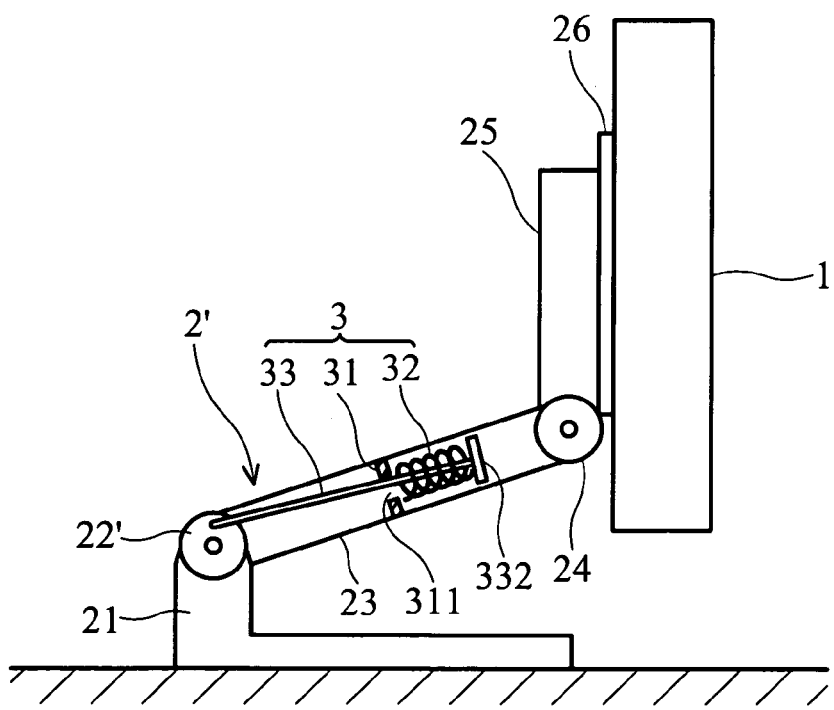
FIG. 8 is a schematic view of the liquid crystal display according to the present invention.

In FIG. 8, a liquid crystal display D of the present invention has a display unit 1, a supporting base 2' and a pre-force mechanism 3. The supporting base 2' has a first section 21, a first pivot 22', a second section 23, a second pivot 24, a third section 25 and a plate 26. The first pivot 22' and the second pivot 24 have the same structure, and the first pivot 22' connects the first section 21 and the second section 23, and the second pivot 24 connects the second section 23 and the third section 25. The display unit 1 is connected to the third section 25 by the plate 26. In another embodiment, the plate can be integrally formed on the end of third section 25, and the display unit 1 can be directly mounted on the third section 25. Thus, the position of the display unit 1 can be adjusted upwardly or downwardly by rotating the second section 23 around the first pivot 22', and the tilt angle of the display unit 1 can be adjusted by rotating the third section 25 around the second pivot 24.

The pre-force mechanism 3 has an annular stopper 31, a resilient element 32 and a rod 33. The stopper 31 is disposed in the hollow second section 23 and rotates around the first pivot 22' when the second section 23 rotates around the first pivot 22'. The stopper 31 has an orifice 311 penetrated by the rod 33. In the present embodiment, the resilient element 32 is a spring.

Figure 9:
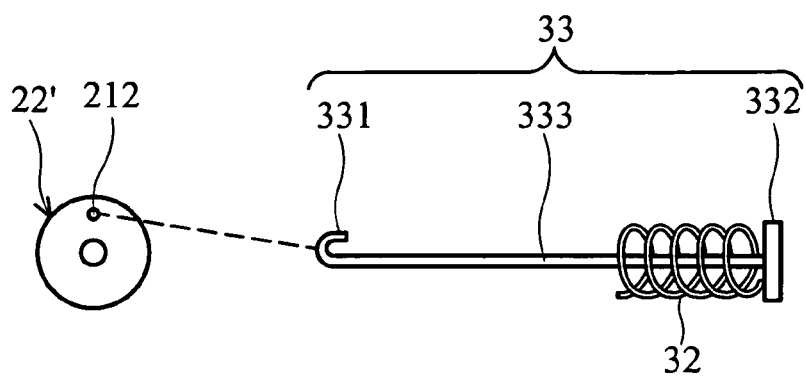
FIG. 9 is a schematic view showing the relationship between a pre-force mechanism (3) and a first pivot (22') of the liquid crystal display in FIG. 8.

In FIG. 9, the rod 33 has a first end 331, a second end 332 and a middle portion 333 located between the first end 331 and the second end 332. The second end 332 is thinner than the middle portion 333 so that the spring 32 is disposed on the middle portion 333 of the rod 33 and confined and pressed between the stopper 31 and the second end 332. Both the rod 33 and the spring 32 are disposed in the second section 23. The first end 331 of the rod 33 is hooked at an opening 212 of the first pivot 22' (See FIG. 10), such that the rod 33 is coupled to the fixed element 211' and the rod 33 rotates around the first pivot 22'.

Figure 10:
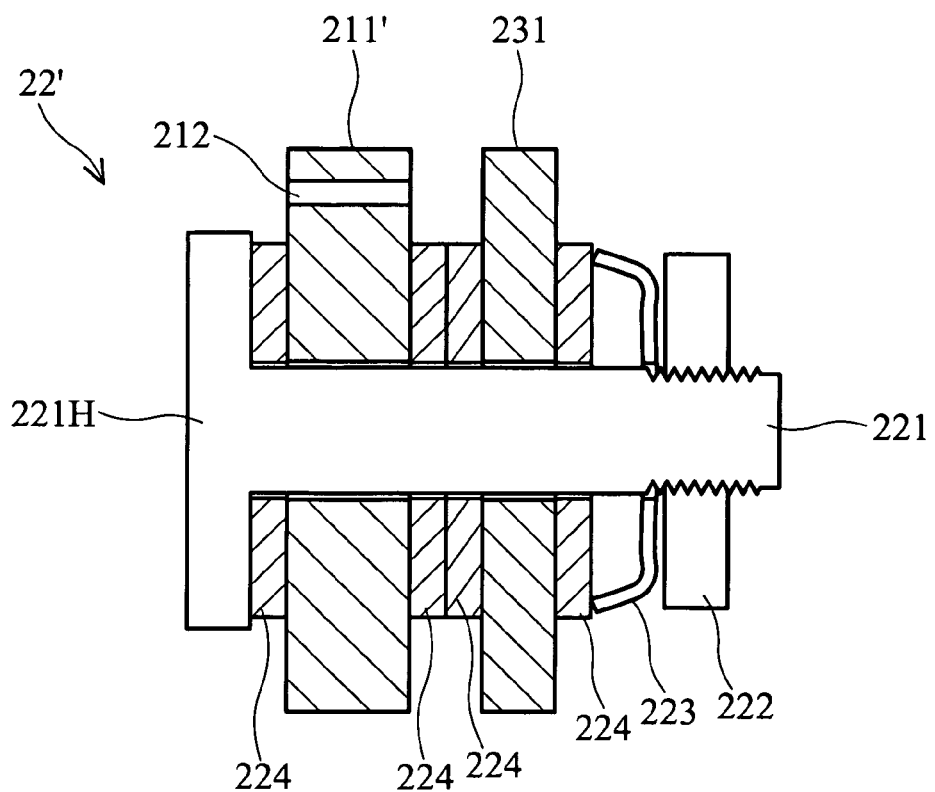
FIG. 10 is a cross-section of the first pivot (22') of the liquid crystal display of FIG. 8 along its longitudinal direction.

FIG. 10 is a cross-section of the first pivot 22' of FIG. 8 along its longitudinal direction. The fixed element 211' is a part installed on the first section 21 of the supporting base 2, and the first section 21 is positioned on the surface 5 motionlessly. A through hole 212 is formed on the fixed element 211'. The movable element 231 is a part installed on the second section 23 of the supporting base 2. A bolt 221 passes through the fixed element 211' and the movable element 231, and is secured by a nut 222. Several washers 224 function as frictional disks are positioned between the bolt 221 and the fixed element 211', and between the fixed element 211' and the movable element 231. The washers 224 are made of soft material, such as rubber, plastic or the like. A U-shaped washer 223 and another washer 224 are disposed between the movable element 231 and the nut 222. The U-shaped washer 223 is used to keep the washer 224 attaching to the fixed element 211 or the moveable element 231. The U-shaped washer 223 can be made of rigid, flexible material, such as steel, copper or the like.

When the nut 222 rotates toward the head 221H, the washer 223 is pushed and moved toward the washer 224 next to the movable element 231. The fixed element 211' and the movable element 231 are then pressed and pushed to approach each other, bracketed by the deformed washers 224. These deformed washers 224 provide frictional force on the fixed element 211' and the movable element 231, such that the frictional force is applied to balance the weight of the display unit 1.

Figure 11:
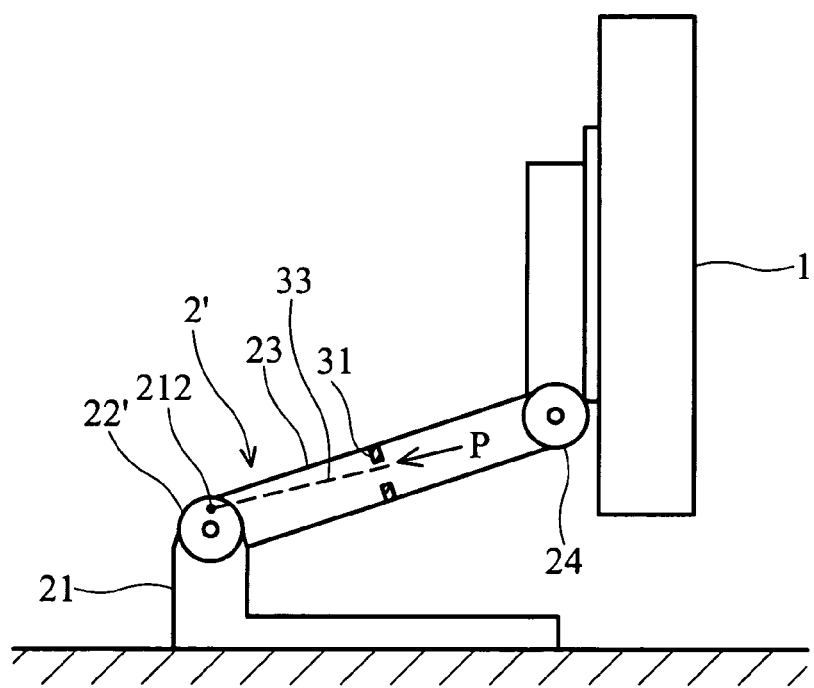
FIG. 11 is a schematic view of the liquid crystal display of FIG. 8, wherein a pre-force (P) generated by the pre-force mechanism (3) is applied in the liquid crystal display.
Figure 12:
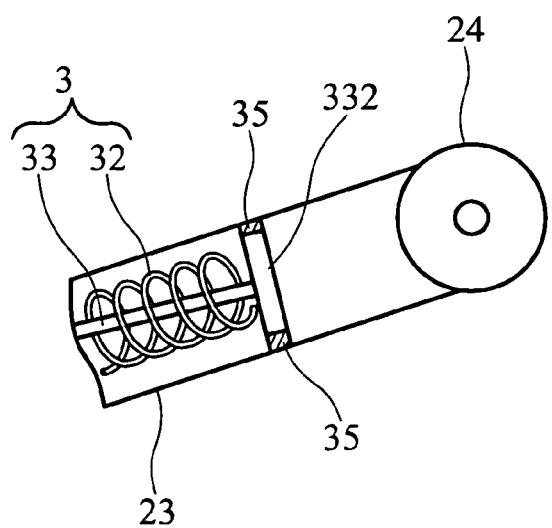
FIG. 12 is a partial view of the liquid crystal display of FIG. 8, wherein a wear liner (35) is disposed between a second section (23) of a supporting base (2) and a rod (33) of the pre-force mechanism (3)

Referring to FIG. 11 and also FIG. 8, the spring 32 confined between the stopper 31 and the second end 332 is compressed so as to generate a force P, pushing the opening 212 of the first pivot 22' through the rod 33. That is to say, the spring 32 is a pre-stressed element and generates the force P to rotate the second section 23 around the first pivot 22' in a counterclockwise direction, i.e., the pre-torque $T_P$ in FIG. 6 is provided by the force P acting on the fixed element 211'. The pre-torque $T_P$ is applied to overcome first torque $T_W$ generated by the weight W of the display unit 1 and the reduced frictional torque $T_{F3}$ in FIG. 7, such that the display unit 1 is easily lifted or adjusted without additional force on the first section 21.

When the display unit 1 is lifted or adjusted, i.e., the second section 23 rotates about the first pivot 22', in a counterclockwise or clockwise direction, the second end 332 of the rod 33 is moved within the second section 23, as demonstrated by the formulas in the following description.

To reduce the frictional resistance of moving the second end 332 and eliminate noise generated by the friction, a wear liner 35 can be disposed between the second end 332 of the rod 33 and the second section 23 of the supporting base 3', i.e., the wear liner 35 can be disposed on the outside of the second end 332 of the rod 33 or on the inner wall of the second section 23 of the supporting base 3'.

Figure 13A:
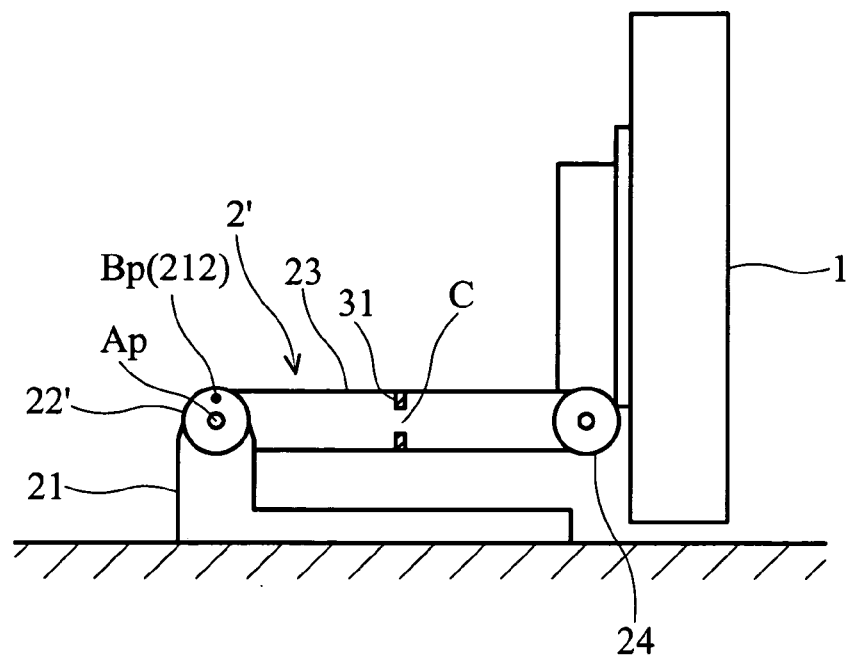
FIG. 13A–13B are two schematic views of the liquid crystal of FIG. 8, wherein the second section (23) of the supporting base (2) in FIG. 13A is in an initial state, and the second section (23) of the supporting base (2) in FIG. 13B is in a raised condition when the display unit (1) is lifted and the second section (23) of the supporting base (2) rotates about an axis (A) of the first pivot (22')
Figure 13B:
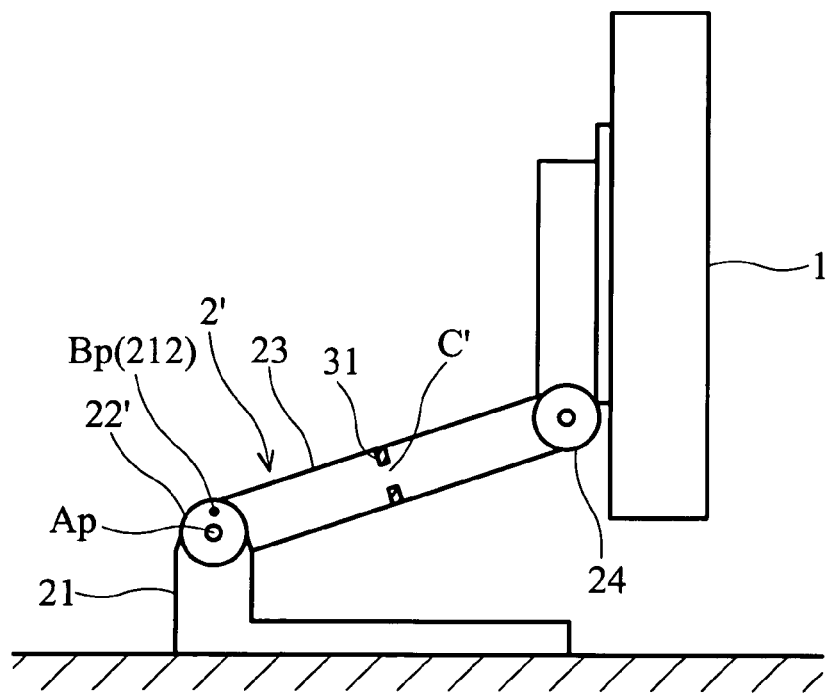

In FIGS. 13A and 13B, A is a center of the first pivot 22', Bp is the location of the opening 212, and Cp is the center of the stopper 31. When the second section 23 rotates around the first pivot 22', the center of the stopper 31 is moved from point Cp to point C'.

Figure 13C:
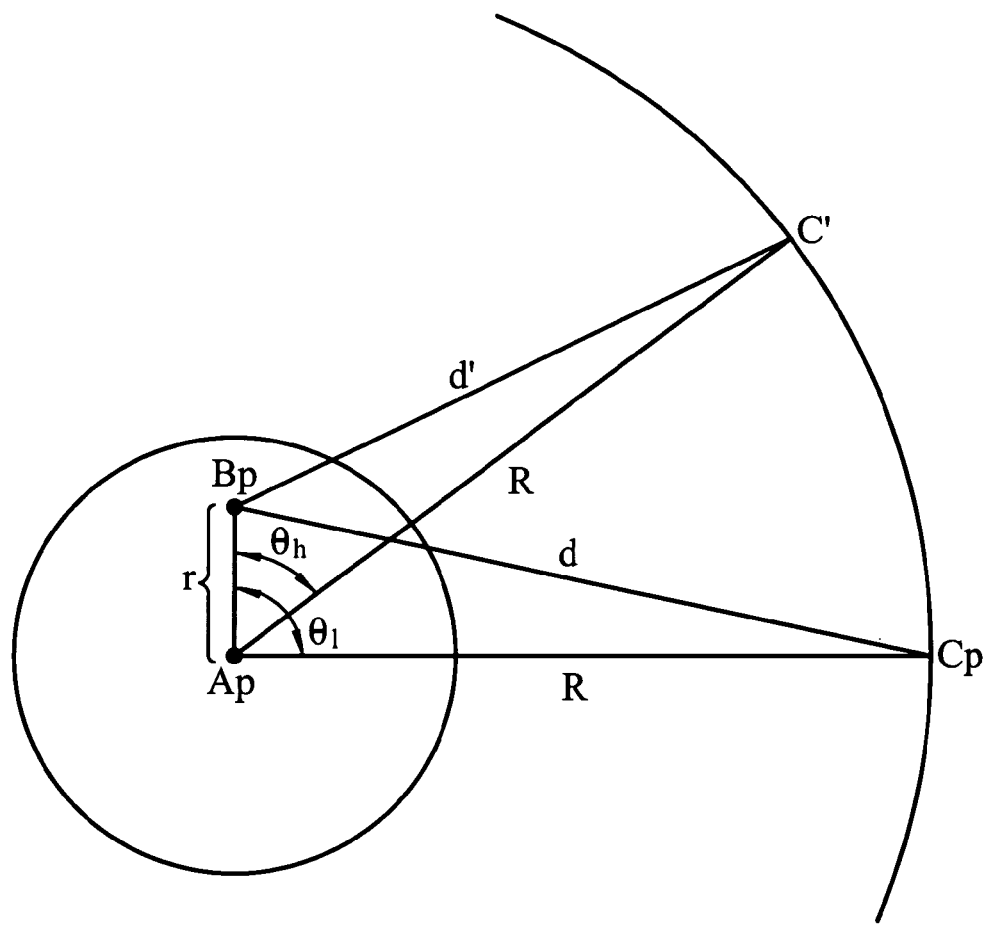
FIG. 13C is a simulation diagram of deployment of the second section (23) of the supporting base (2), wherein a distance from point (A) to point (C) represents the state of the second section (23) of the supporting base (2) in FIG. 13A, and a distance from point (A) to point (C') represents the state of the second section (23) of the supporting base (2) in FIG. 13B.

FIG. 13C is a resultant diagram of FIGS. 13A and 13B together. Distance "$\overline{ApBp}$" measured from points Ap to Bp is a constant whenever the second section 23 rotates around the first pivot 22', and "$\overline{ApBp}$" is defined as "r" ($\overline{ApBp}$=r). With respect to point Ap, distance "$\overline{ApCp}$" measured from points Ap to Cp, and distance "$\overline{ApC'}$" measured from points Ap to C' are also constant and have the same value, and therefore, "$\overline{ApCp}$" and "$\overline{ApC'}$" are defined as "R" ($\overline{ApCp}$=$\overline{ApC'}$=R). In addition, the distance between points Bp and Cp is "d", and the distance between points Bp and C' is "d'".

Based on Cosine equation, a geometric formula for the triangle $\triangle ApBpC$ is expressed as follows:

$$d^2 = r^2 + R^2 - 2rR \cos \theta_l \quad (1)$$

Another geometric formula for the triangle $\triangle ApBpC'$ is expressed as follows:

$$d'^2 = r^2 + R^2 - 2rR \cos \theta_h \quad (2)$$

By subtracting (2) from (1) to get a formula (3) as follows:

$$d^2 - d'^2 = 2rR(\cos \theta_h - \cos \theta_l) \quad (3)$$

In FIG. 13C, $\theta_h$ is an angle between edge $\overline{ApBp}$ and $\overline{ApC'}$, and $\theta_l$ is an angle between edge $\overline{ApBp}$ and $\overline{ApCp}$, $\theta_h$ is small than $\theta_l$, and thus cos $\theta_h$ exceeds cos $\theta_l$, $$\theta_h < \theta_l \Rightarrow \cos \theta_h > \cos \theta_l \Rightarrow \cos \theta_h - \cos \theta_l > 0 \quad (4)$$

Putting (4) into (3) results in formula (5) as follows:

$$d^2 - d'^2 = 2rR(\cos\theta_h - \cos\theta_l) > 0 \Rightarrow \quad (5)$$

$$d^2 - d'^2 = (d+d')(d-d') > 0 \Rightarrow$$

$$d - d' > 0$$

In formula (5), it is understood that the distance between the opening 212 and the stopper 31 decreases when the second section 23 rotates around the first pivot 22' in a counterclockwise direction, as the distance between the stopper 31 and the second end 332 increases. Thus, the second end 332 of the rod 33 is moved within the second section 23 whenever the second section 23 rotates about the first pivot 22'.

Figure 14:
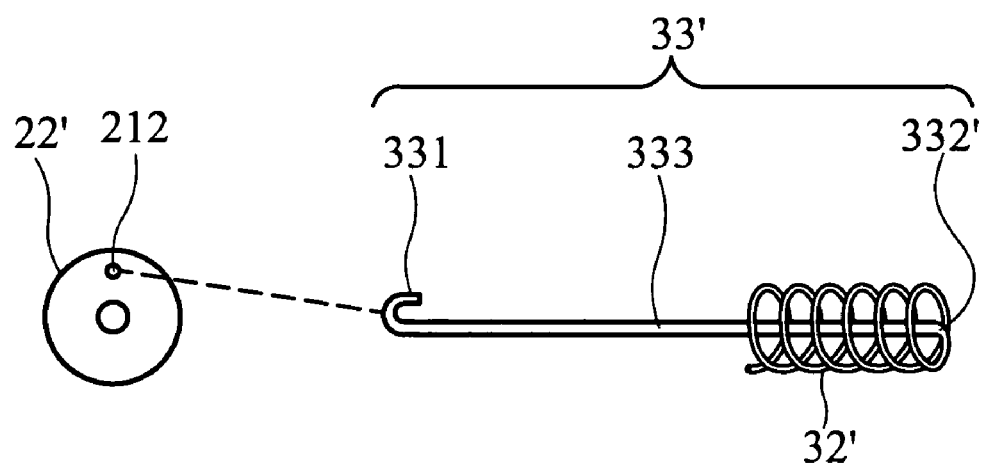
FIG. 14 is a schematic view of an exemplary rod (33') of the pre-force mechanism (3).

Referring to FIG. 14, a different pre-force mechanism is provided. The rod 33' is a variant of the rod 33 in FIG. 9. The rod 33' differs from the rod 33 in that the resilient element (spring) is integrally formed on the rod 33'. A resilient portion 32' is integrally formed on the second end 332' of the rod 33' and encloses the rod 33'. When the rod 33' is properly disposed in the second section 23 of the supporting base 2', the spring 32' is confined between the stopper 31 and the second end 332 and compressed, such that the force (as the same force P in FIG. 11) is generated by the compressed spring 32' pushing the opening 212 of the first pivot 22' through the rod 33'. Thus, the pre-torque $T_P$ overcomes gravity torque $T_W$ generated by the display unit 1, such that display unit 1 can be easily lifted or adjusted without additional force on the first section 21.

While this invention has been described in connection with what is presently considered to be the most practical and preferred embodiment, it is to be understood that the invention is not limited to the disclosed embodiments, but, on the contrary, is intended to enclose various modifications and equivalent arrangements included within the spirit and scope of the appended claims.

What is claimed is:

1. A liquid crystal display, comprising:
   a supporting base having a first section, a second section, a third section, a first pivot positioned between the first section and the second section, and a second pivot positioned between the second section and the third section, wherein the second section of the supporting base is hollow, and wherein the first pivot comprises a fixed element connected to the first section of the supporting base, and a movable element connected to the second section of the supporting base;
   a display unit connected to the third section of the supporting base, exerting a first torque on the first pivot by a weight of the display unit; and a pre-force mechanism having a first end connected to the first pivot and a second end movably disposed in the second section, wherein the pre-force mechanism comprises a rod coupled to the fixed element of the first pivot, a stopper disposed in the second section of the supporting base, and a spring disposed on the rod and pressed against the stopper, and wherein the pre-force mechanism exerts a second torque on the first pivot, and the second torque and the first torque being in opposite directions;

wherein the rod comprises the first end coupled to the fixed element of the first pivot, the second end movably disposed in the second section of the supporting base, and a middle portion located between the first end and the second end.

2. The liquid crystal display as claimed in claim 1, wherein the fixed element of the first pivot comprises an opening, and the first end of the rod is hooked at the opening such that the rod is coupled to the fixed element.

3. The liquid crystal display as claimed in claim 1, wherein the second end of the rod is thinner than the middle portion of the rod so that the spring is positioned between the stopper and the second end of the rod.

4. The liquid crystal display as claimed in claim 1, wherein the spring is integrally formed on the second end of the rod.

5. The liquid crystal display as claimed in claim 1 further comprising a wear liner disposed between the second end of the rod and the second section of the supporting base.

6. The liquid crystal display as claimed in claim 5, wherein the wear liner is fixed on the second end of the rod.

7. The liquid crystal display as claimed in claim 5, wherein the wear liner is fixed on an inner wall of the second section of the supporting base.

8. A supporting base, comprising:
a first section;
a second section, wherein the second section is hollow;
a first pivot coupled to the first section and the second section, wherein the first pivot comprises a fixed element connected to the first section and a movable element connected to the second section;
a third section exerting a first torque;
a second pivot coupled to the third section and the second section; and a pre-force mechanism having a first end connected to the first pivot and a second end movably disposed in the second section, wherein the re-force mechanism comprises a rod coupled to the fixed element of the first pivot, a stopper disposed in the second section, and a spring disposed on the rod and pressed against the stopper, and wherein the pre-force mechanism exerts a second torque opposite to the first torque on the first pivot;
wherein the rod comprises the first end coupled to the fixed pivot, the second end movably disposed in the second section of the supporting base, and a middle portion located between the first end and the second end.

9. The supporting base as claimed in claim 8, wherein the fixed element of the first pivot comprises an opening, and the first end of the rod is hooked at the opening of the fixed element of the first pivot such that the rod is coupled to the fixed element.

10. The supporting base as claimed in claim 8, wherein the second end of the rod is thinner than the middle portion of the rod so that the spring is positioned between the stopper and the second end of the rod.

11. The supporting base as claimed in claim 8, wherein the spring is integrally formed on the second end of the rod.

12. The supporting base as claimed in claim 8, further comprising a wear liner disposed between the second end of the rod and the second section.

13. The supporting base as claimed in claim 12, wherein the wear liner is fixed on the second end of the rod.

14. The supporting base as claimed in claim 12, wherein the wear liner is fixed on an inner wall of the second section.

* * * * *

UNITED STATES PATENT AND TRADEMARK OFFICE
CERTIFICATE OF CORRECTION

PATENT NO. : 7,258,311 B2  Page 1 of 1
APPLICATION NO. : 10/806493
DATED : August 21, 2007
INVENTOR(S) : Ching-Hui Yen and Posen Chiu It is certified that error appears in the above-identified patent and that said Letters Patent is hereby corrected as shown below:

On the title page, item [73] should read:
ASSIGNEE;

BENQ Corporation  Taoyuan (TW)
    Fulfil Technology Co., Ltd.  Taipei (TW)

Signed and Sealed this

First Day of April, 2008

JON W. DUDAS
*Director of the United States Patent and Trademark Office*